United States Patent

Carr et al.

[11] Patent Number: 5,297,428
[45] Date of Patent: Mar. 29, 1994

[54] SALT LEVEL MONITORING DEVICE

[75] Inventors: Larry L. Carr, Chesterland; James R. Mismas, Concord Township, Cuyahoga County, both of Ohio

[73] Assignee: Tridelta Industries, Inc., Mentor, Ohio

[21] Appl. No.: 929,679

[22] Filed: Aug. 13, 1992

[51] Int. Cl.$^5$ ............................................. G01F 23/00
[52] U.S. Cl. ................................... 73/290 R; 340/617; 210/86; 210/91
[58] Field of Search ........................ 340/617; 73/290 R; 200/543; 210/91, 190, 86

[56] References Cited

U.S. PATENT DOCUMENTS

| | | | |
|---|---|---|---|
| 848,519 | 3/1907 | Versteeg | 340/617 |
| 1,939,368 | 12/1933 | Rydmark et al. | 340/617 |
| 2,116,075 | 5/1938 | Lenhart | 340/617 |
| 2,571,378 | 10/1951 | Parisi | 340/617 |
| 2,774,959 | 12/1956 | Edelman et al. | 340/617 |
| 2,848,585 | 8/1958 | Atkin | 200/543 |
| 3,102,175 | 8/1963 | Eichenberger, Jr. | 340/617 |
| 3,911,691 | 10/1975 | Kohl et al. | 340/617 |
| 4,219,133 | 8/1980 | Sinsky | 340/617 |
| 4,312,225 | 1/1982 | Williams | 340/617 |
| 4,387,593 | 6/1983 | Moseman | 340/617 |
| 4,982,606 | 1/1991 | Adamski et al. | 73/304 C |
| 4,987,409 | 1/1991 | Jackson | 340/623 |
| 5,147,531 | 9/1992 | Dougal | 340/617 |

FOREIGN PATENT DOCUMENTS

| | | | |
|---|---|---|---|
| 0607014 | 12/1934 | Fed. Rep. of Germany | 340/617 |
| 0892978 | 10/1953 | Fed. Rep. of Germany | 340/617 |
| 0881389 | 4/1943 | France | 340/617 |
| 0613066 | 11/1948 | United Kingdom | 200/543 |
| 0966620 | 8/1964 | United Kingdom | 200/543 |

OTHER PUBLICATIONS

Gunn, J., "Light Warns when Coal Gets Low in the Stoker Hopper," Popular Mechanics, p. 92 (Jan. 1944).

Primary Examiner—Diego F. F. Gutierrez
Attorney, Agent, or Firm—D. Peter Hochberg; Mark Kusner; Michael Jaffe

[57] ABSTRACT

A device for monitoring the level of salt in a brine tank. The device includes a housing and a circuit within the housing connectable to an electric power source. An indicator is connectable to the circuit for indicating the existence of a first electrical state and a second electrical state. An actuator member is provided having a first position wherein the indicator member indicates the first electrical state and a second position wherein the indicator member indicates the second electrical condition. A biasing member having a predetermined force biases the actuator member towards the first position. A surface member is provided for resting on the upper surface of the material in the tank, the surface member having a weight greater than the predetermined force of the biasing member and a density greater than water. The surface member is movable in the brine tank as the height of salt therein descends, and is connected to the actuator member, wherein the weight of the surface member causes the actuator member to move to the second position when the surface member descends a predetermined distance.

19 Claims, 6 Drawing Sheets

SALT LEVEL MONITORING DEVICE

Field of the Invention

The present invention relates generally to devices for monitoring the level of solid particulate material within a container, and more particularly for a device for use with a salt-water brine tank to monitor the level of salt within the tank and to provide an indication as to when the salt has reached a predetermined level within the tank.

BACKGROUND OF THE INVENTION

The present invention relates generally to a level sensing and indicating device used for monitoring the level of solid materials within a container, and more specifically, to a device for monitoring the level of salt in a brine tank typically used in water treatment devices, such as a water filtering device or a water softening device. In this respect, such water treatment devices typically utilize a brine solution, i.e. salt water, as a cleaning agent. The brine solution is typically produced in a brine tank which contains salt in either particulate or block form. Water is introduced into the brine tank, therein dissolving some of the salt, and creating the brine solution. At periodic intervals, the brine solution is removed from the brine tank for use in the treatment device. Fresh water is then added to the brine tank to produce a new supply of the brine solution, thereby dissolving more of the salt.

Devices to monitor the level of salt within such brine tanks are shown in U.S. Letters Pat. No. 4,987,409 to Jackson and U.S. Letters Pat. No. 3,102,175 to Eichenberger. These patents generally disclose devices which sense a change in the level of solid material in a tank by using either: (1) a buoyant sensor that measures the difference between the upper level of water and the upper level of the salt within the tank, or (2) a sensor which measures the change in pressure exerted on it by the salt.

A problem with such devices is that they may not function properly if the solid material becomes unevenly distributed in the tank; nor are they particularly suitable for use with salt comprised of blocks rather than granular particles. In this respect, a device using a pressure sensor may prematurely indicate that the salt in the tank is low if blocks of salt resting on the sensor dissolve unevenly and slide off the sensor or off each other. Similarly, a floating sensor device may become prematurely buoyant and falsely indicate that the level of salt is low if the salt becomes unevenly distributed within the tank. The uneven distribution of salt may cause the difference in the level of the water and the upper surface of the salt to be greater on one side of the tank than on the other thus causing the sensor to float. Moreover, the aforementioned patents disclose devices which contain switches disposed within the brine tank in contact with the brine solution and are thus exposed to an extremely corrosive environment which could eventually affect the operation of the switch.

These and other problems are overcome by the present invention which provides a device for sensing the level of salt within a brine tank by using an element to continuously rest on the upper surface of the salt regardless of the water level and regardless of the form or the configuration of the salt within the brine tank.

SUMMARY OF THE INVENTION

In accordance with the present invention, there is provided a device for monitoring the level of salt in a brine tank. The device includes a housing and a circuit within the housing connectable to an electric power source. The circuit includes indicator means for indicating the existence of a first electrical state and a second electrical state and switch means having a first position wherein the indicator means indicates the first electrical state and a second position wherein the indicator means indicates the second electrical condition. Biasing means having a predetermined force biases the switch means toward the first position. Surface means are provided for resting on the upper surface of the material in said tank, the surface means having a weight greater than the predetermined force of the biasing means, and a density greater than water. The surface means are movable in the brine tank as the height of salt therein varies and is connected to the switch means, wherein the weight of the surface means causes the switch means to move to the second position when the surface means descends a predetermined distance.

It is an object of the present invention to provide a device for monitoring the level of solid material within a container and for indicating when such material has reached a predetermined level within the container.

Another object of the present invention is to provide a device as defined above which is operable with both granular particles and blocks of material.

Another object of the present invention is to provide a device as defined above for use in a brine tank, which device senses the level of salt within the tank irrespective of the water level therein.

Another object of the present invention is to provide a device as defined above having electrical conductive switching elements which are positioned external to the brine tank.

Another object of the present invention is to provide a device as defined above wherein the conductive switching elements are in a normally closed position when the device is in a neutral, i.e. non-activated state, to prevent contamination and oxidation of the surfaces of the conductive switching element.

Another object of the present invention is to provide a device which is inexpensive to manufacture and simple to use.

These and other objects and advantages will become apparent from the following description of a preferred embodiment of the invention taken together with the accompanying drawings.

DRAWINGS

The invention may take form in certain parts and arrangement of parts, a preferred embodiment of which will be described in detail in the specification and illustrated in the accompanying drawings wherein.

Figure 1:
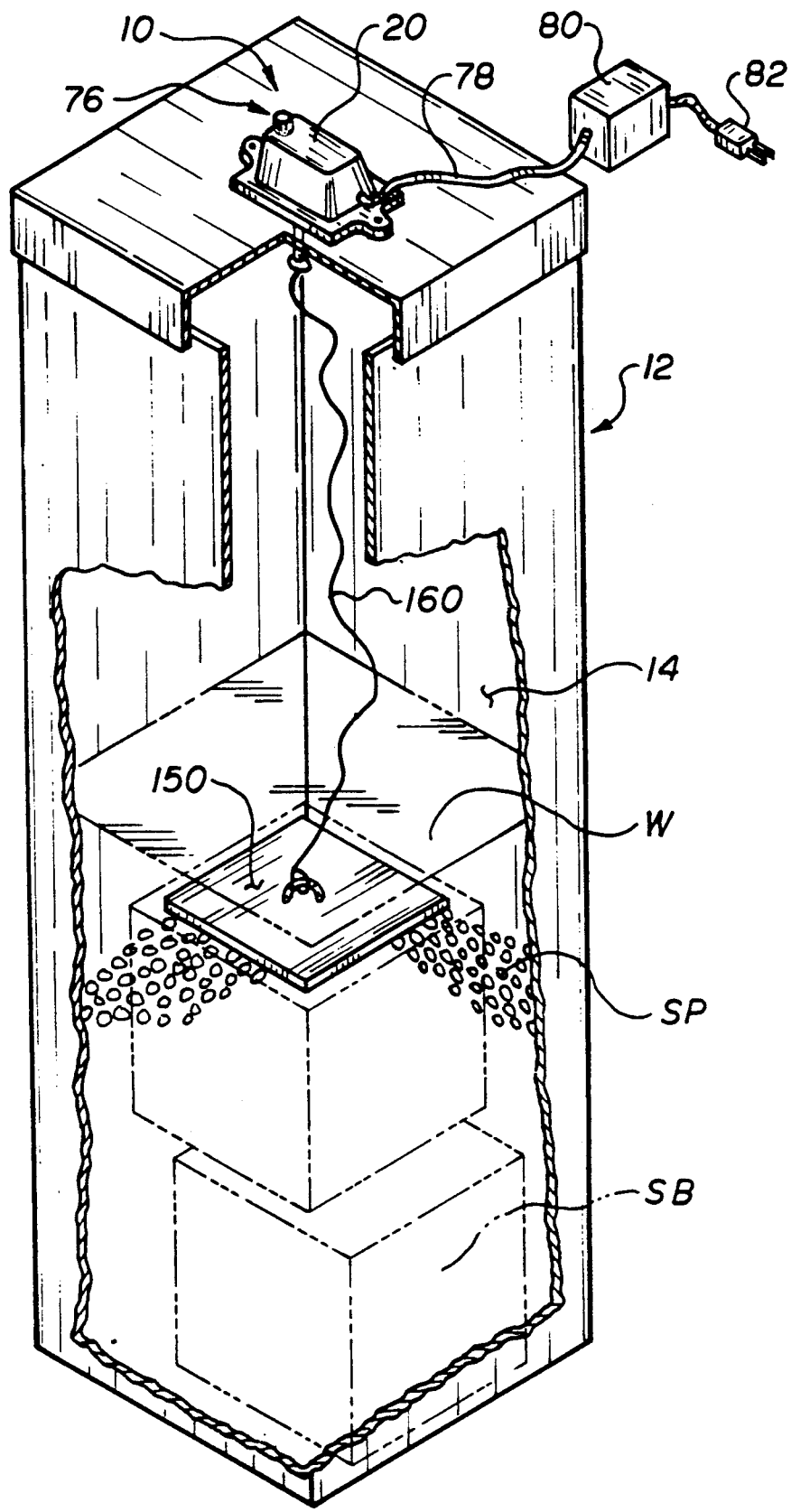
FIG. 1 is a partially-sectioned, perspective view showing a brine tank and a salt level monitoring device according to a preferred embodiment of the present invention.
Figure 4:
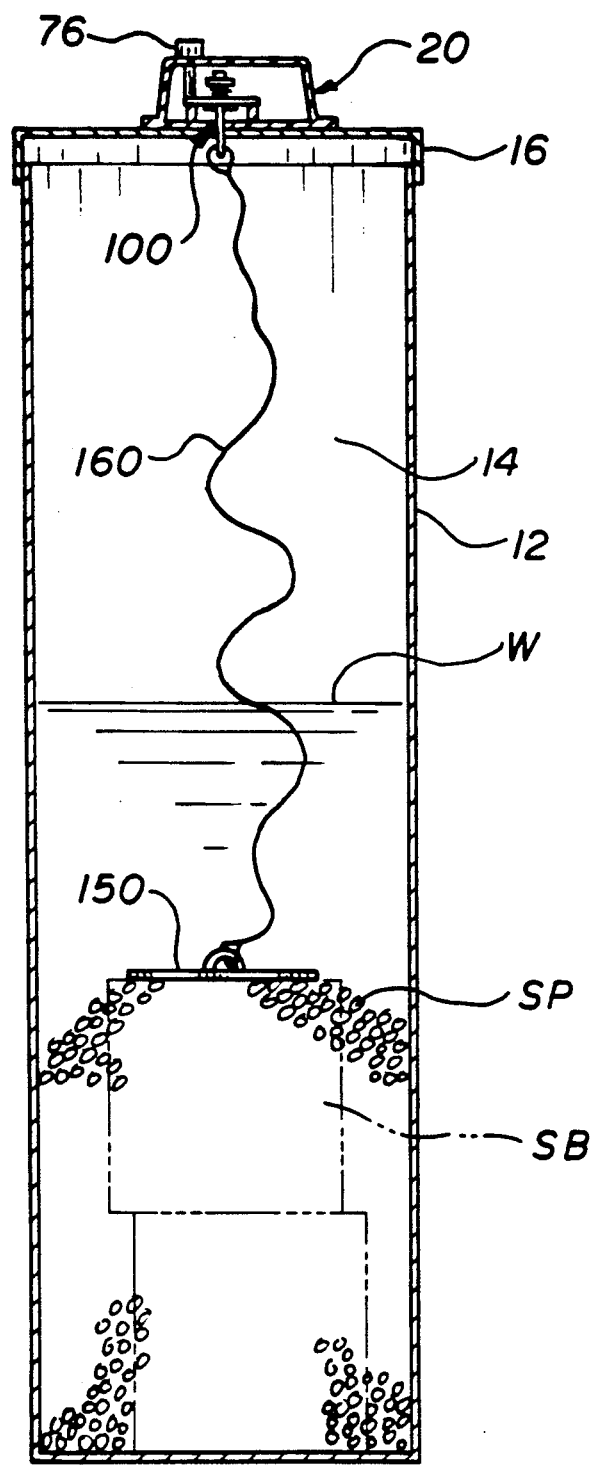
Figure 5:
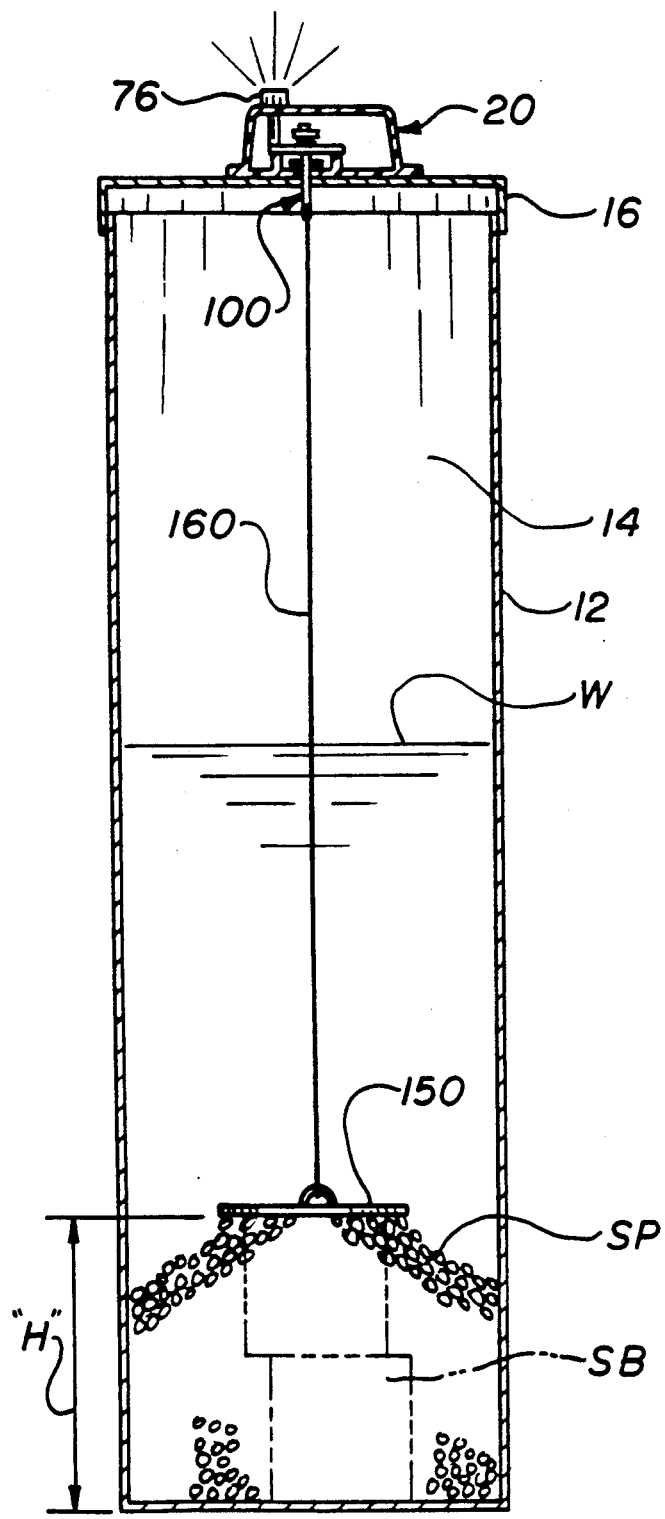
Figure 6:
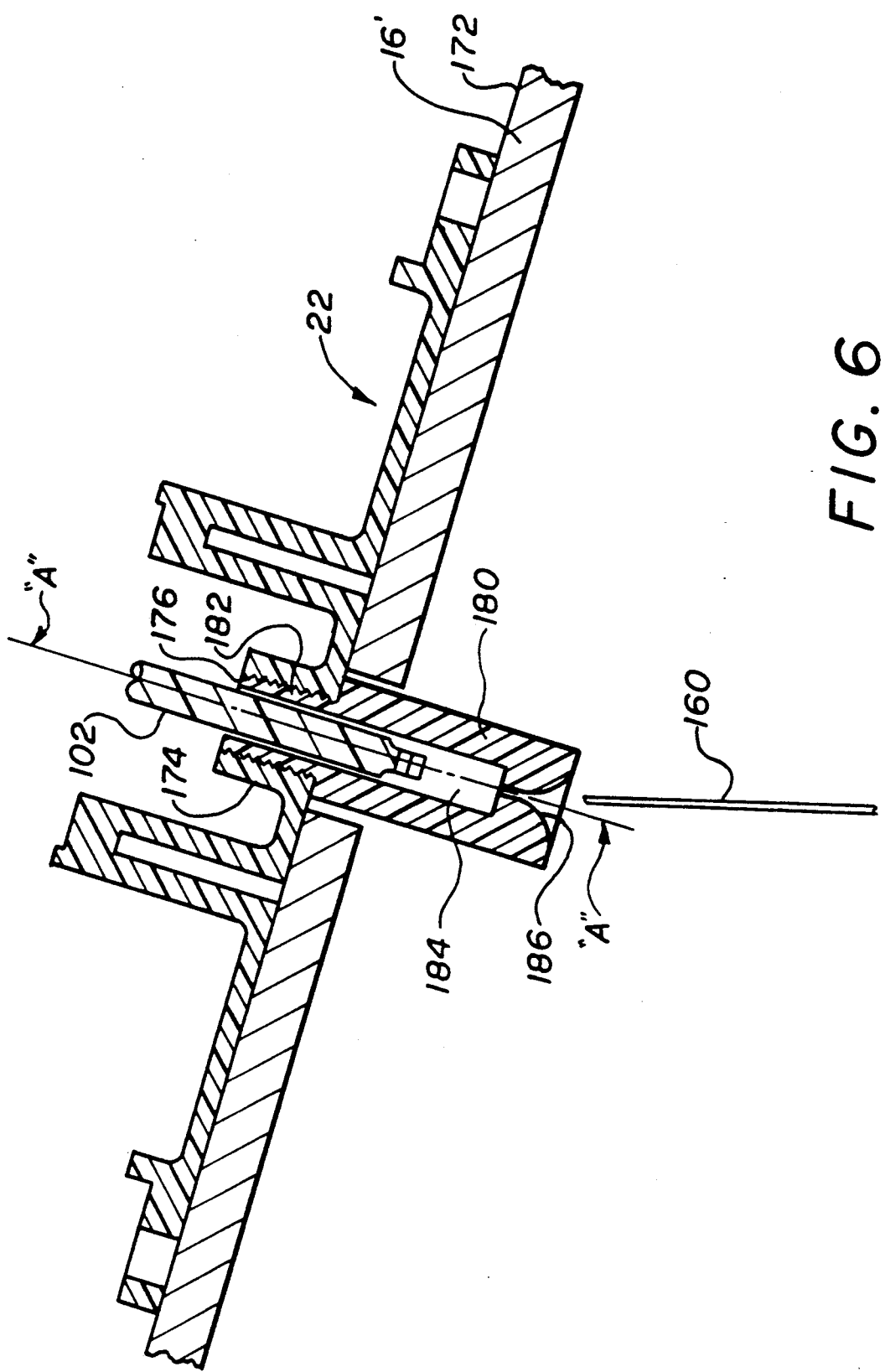

FIGS. 4 and 5 are sectional views of a brine tank and a salt level monitoring device according to the present invention illustrating operation thereof; and FIG. 6 is a sectional view of a lower housing section of the salt level monitoring device shown in FIG. 1 illustrating an alternate embodiment of the present invention for mounting to a brine tank having a lid thereon which is in an inclined, i.e. non-horizontal, position.

DETAILED DESCRIPTION OF PREFERRED EMBODIMENT

Referring now to the drawings wherein the showings are for the purpose of illustrating the preferred embodiment of the invention and not for the purpose of limiting, same, a level sensing and indicating device 10 in accordance with the present invention is shown for use in a tank containing solid material. Level sensing and indicating device 10 is particularly applicable for use in a salt-brine tank 12, which is generally used as part of a water treatment system, such as a water filtering system or water softening system (not shown) to monitor the amount of salt in such tank and to provide an indication when the salt therein has dropped below a predetermined level.

Salt-brine tank 12 in and of itself forms no part of the present invention, and therefore, it shall not be described in great detail. Generally, such tank may be rectangular or cylindrical in shape and define an inner chamber 14 for holding salt, and in which water "W" may be mixed with the salt to produce a brine solution. Tank 12 typically includes a lid 16 to cover chamber 14. The salt in tank 12 may be in particulate form, as shown in FIG. 1 and designated "SP" or be in block form, shown in phantom and designated "SB" in FIG. 1. As water is added to tank 12, a quantity of salt dissolves to create a brine solution. During the normal operation of most water treatment systems, the brine solution is removed periodically from tank 12 for use in the water treatment system. Fresh water is then added to the tank to produce a new brine solution, thereby dissolving more of the salt. As the salt within tank 12 is dissolved, the top level of salt vertically descends. According to the present invention, level sensing and indicating device 10 is adapted to detect changes in the level of salt in brine tank 12 and to indicate when the level thereof has descended to a certain level.

Figure 2:
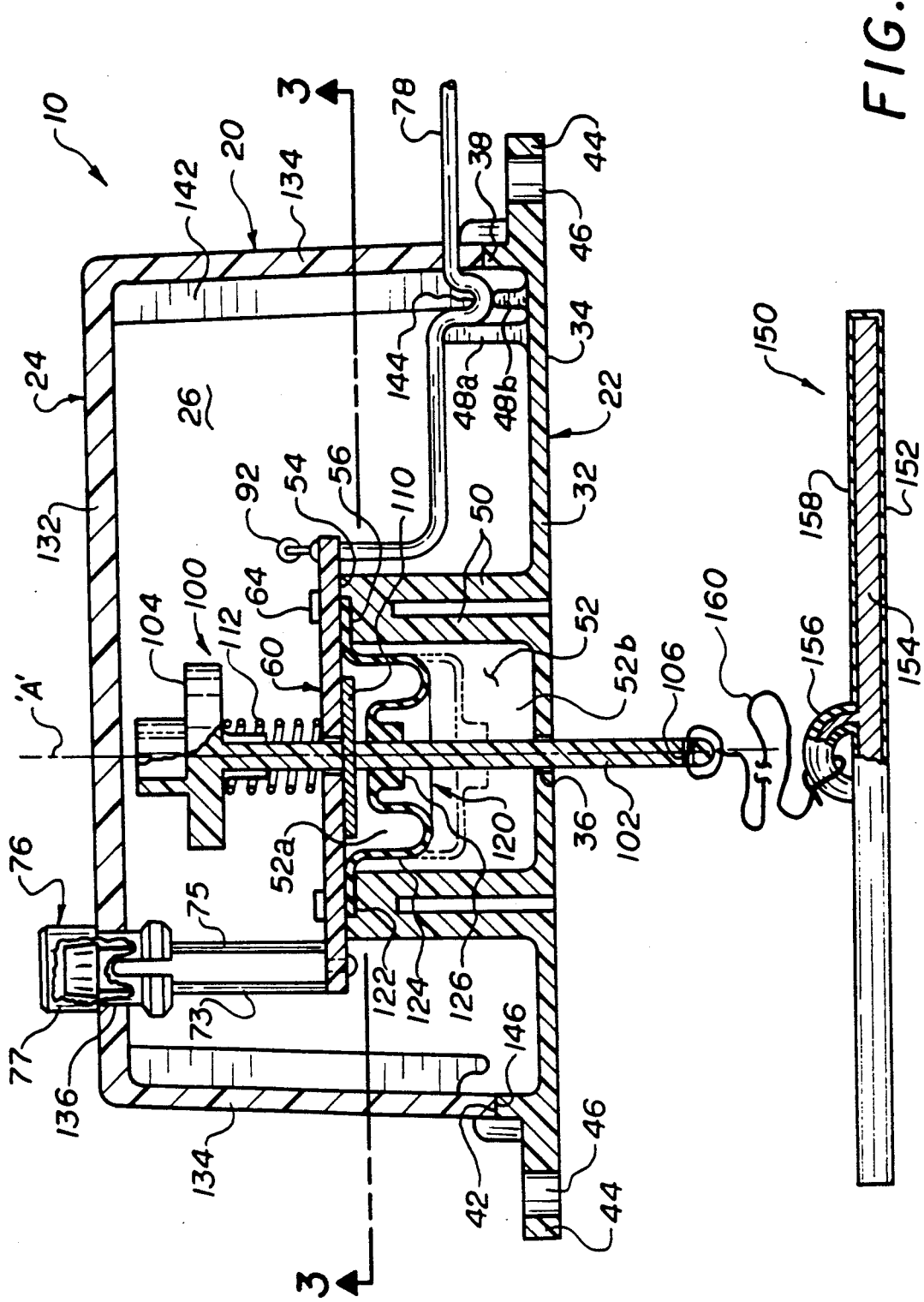
FIG. 2 is a sectional elevational view of the level sensing and indicating device shown in FIG. 1.

Referring now to FIG. 2, level sensing and indicating device 10 includes a generally rectangular housing 20 which is comprised of a lower housing section 22 and an upper housing section 24. An inner cavity 26 is defined between lower housing section 22 and upper housing section 24. Lower housing section 22 is generally a rectangular plate 32 having a generally planar lower surface 34. An aperture 36 is located centrally through lower housing section 22. An upward extending wall 38 which is generally perpendicular to lower surface 34 extends about the periphery of lower housing section 22 and includes an upward facing mating surface 42. Outward-extending tabs 44 project from the lengthwise edges of lower housing section 22. Each tab 44 has an aperture 46 formed therethrough generally perpendicular to lower surface 34. A pair of upward extending fingers 48a, 48b are formed near one lengthwise edge of lower housing section 22 adjacent upward extending wall 38. Fingers 48a, 48b extend generally perpendicular to lower surface 34. An upward-extending wall 50 extends from the upper surface of lower housing section 22. Wall 50 is generally cylindrical in shape and defines a chamber 52. The outer peripheral edge of wall 50 includes an upward extending shoulder 54 which defines an annular groove 56 along the inner peripheral edge of wall 50.

Figure 3:
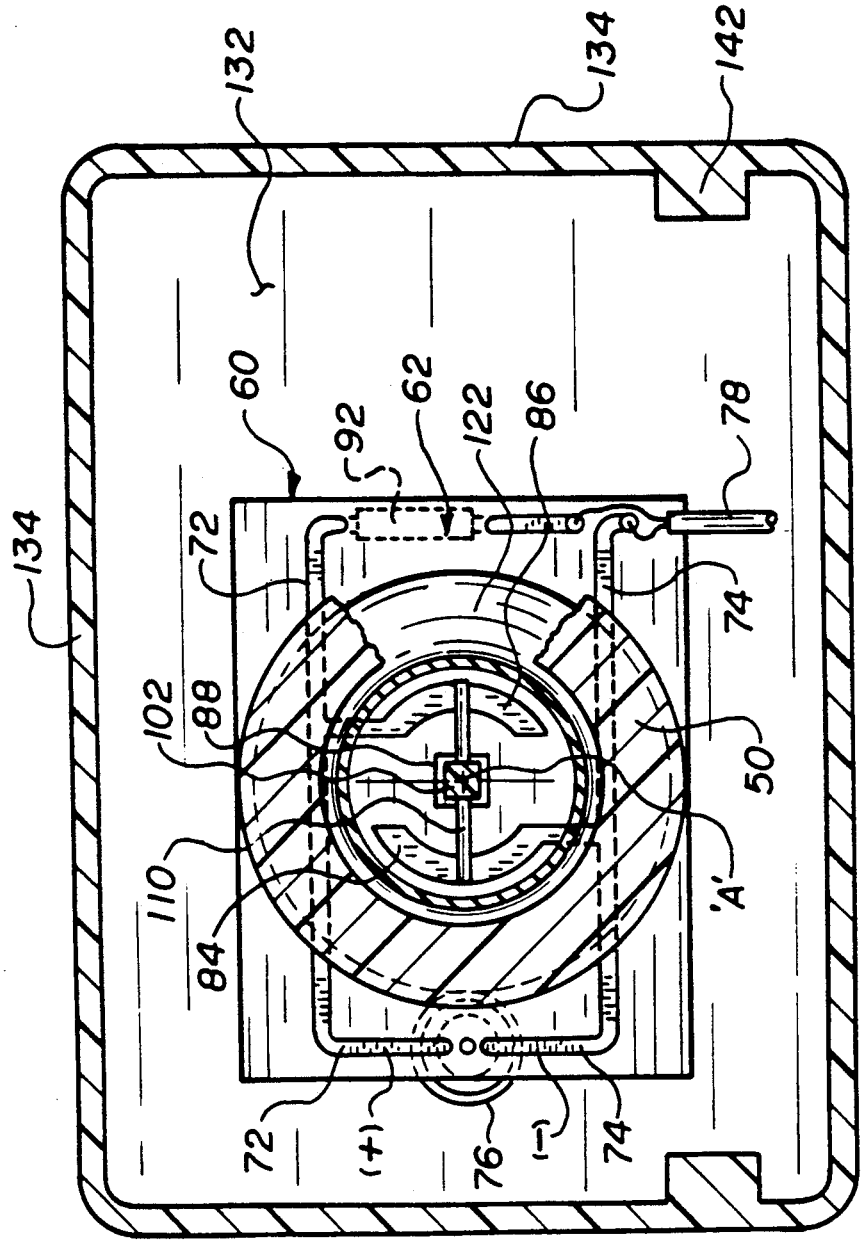
FIG. 3 is a sectional view taken along lines 3—3 of FIG. 2.

A generally rectangular circuit board 60 having a printed circuit 62 thereon is mounted on shoulder 54 of wall 50. Circuit board may be attached to wall 50 by conventional fasteners, but in the embodiment shown is "heat staked" in place in a manner which is conventionally known. As best seen in FIG. 3, printed circuit 62 is generally comprised of two spaced-apart circuit traces 72, 74, which circuit traces 72, 74 are connected at one end to an indicator device 76 and at the other end to an electrical power, such as a conventional electrical outlet or a battery pack which may be internal or external of housing 20. In the embodiment shown, indicator device 76 is an illuminatable lamp or bulb and the electrical source is a conventional electrical outlet (not shown). With respect to the latter, a conventional electrical cord 78 is connected to circuit traces 72, 74 with circuit 62 having a polarity as shown in FIG. 3. Electrical cord 78 is connected to a transformer 80 and to a conventional plug 82 (best seen in FIG. 1) for insertion into a standard electrical outlet. In this respect, transformer 80 is provided to reduce the current from the outlet to printed circuit 62. Indicator lamp 76 is basically comprised of a conventional L.E.D. (not shown) having a protective lens cover 77 thereover. The L.E.D. may provide constant illumination or intermittent illumination (i.e. blinking) when current is passed therethrough. Indicator 76 is connected to the ends of circuit traces 72, 74 by flexible leads 73, 75. Circuit traces 72, 74 include arcuate, stationary contacts, designated 84, 86 in the drawings. Arcuate stationary contacts 84, 86 are generally symmetrically disposed about a rectangular aperture 88 formed in circuit board 60. A resistive element 92 is provided in circuit trace 72 between stationary contact 86 and electrical cord 78. In this respect, resistive element 92 is on the positive side of indicator 76, as shown in FIG. 3. Circuit board 60 is disposed on vertical wall 50 with circuit 62 facing downward toward the lower housing section 22 and with rectangular aperture 88 in circuit board 60 in vertical alignment with aperture 36 in lower housing section 22. More specifically, apertures 36, 88 are generally aligned along an axis, designated "A" in the drawings.

According to the present invention, an elongated actuator 100 is provided to operatively interact with circuit 62 of circuit board 60. Actuator 100 is generally comprised of a non-conductive, elongated shaft 102 having an enlarged cap 104 formed at one end thereof. Shaft 102 is generally rectangular in cross-section over the major portion thereof, shaft 102 being circular in cross-section near its free end. Shaft 102 is dimensioned to be free received in apertures 88 and 36 of circuit board 60 and lower housing section 22, respectively. In this respect, shaft 102 is adapted to be reciprocally movable along axis "A" and has a predetermined length such that the free end thereof extends beyond lower housing section 22 irrespective of the position of actuator along axis "A". A hole 106 is formed in the free end of shaft 102. According to the present invention, actuator 100 is preferably formed of electrically non-conductive material, such as plastic.

A conductive element 110 is mounted to shaft 102 and extends perpendicular thereto. In the embodiment shown, conductive element 110 is a copper pin which extends through shaft 102, as best seen in FIG. 3. Conductive element 110 is positioned below the lower surface of circuit board 60 and has a length so as to interact with spaced-apart stationary contacts 84, 86, as will be described in greater detail below.

A biasing element 112 in the form of a helical spring having a predetermined biasing force is mounted onto shaft 102 of actuator 100 and is disposed between cap 104 and circuit board 60. Biasing element 112 biases actuator 100 to a first position wherein conductive element 110 engages spaced-apart stationary contacts 84, 86, as best seen in FIG. 2.

According to another aspect of the present invention, a resilient, flexible baffle 120 is disposed between circuit board 60 and vertical wall 50. Baffle 120 includes a planar outer edge portion 122, an intermediate contoured portion 124 and an inner sleeve portion 126. As best seen in FIG. 2, baffle 120 is dimensioned such that outer edge portion 122 is received within annular groove 56 and snugly confined between circuit board 60 and vertical wall 50. Inner sleeve portion 126 includes an opening dimensioned to snugly receive shaft portion 102 of actuator 100. Sleeve portion 126 is preferably mounted onto shaft portion 102 to be movable therewith and to form a tight seal therewith. In this respect, baffle 120 essentially divides chamber 52 into an upper chamber section 52a and a lower chamber section 52b, and isolates circuit 62 and conductive element 110 in upper chamber section 52a.

Upper housing section 24 includes a generally flat top wall 132 and downward extending side walls 134. Downward extending side walls 134 are generally perpendicular to and preferably integrally formed with top wall 132. An opening 136, best seen in FIG. 2, is provided through top wall 132, and is dimensioned to receive protective lens 77 of indicator 76 therethrough in snap-lock fashion. A downward extending ridge 142 is formed along the inner surfaces of both lengthwise side walls 134 and includes a downward projecting finger 144 at the lower end thereof. Finger 144 is disposed along upper housing section 24 to operatively interact with fingers 48a, 48b on lower housing section 22. The lower ends of side walls 134 form a downward facing mating surface 146 which is dimensioned to matingly engage upward facing mounting surface 42 of lower housing section 22. In this respect, according to the present invention, lower housing section 22 and upper housing section 24 are preferably formed of a tough, unrigid, plastic material and are adapted to be joined along mating surfaces 42, 146. In the embodiment shown, lower housing section 22 is preferably ultrasonically welded to upper housing section 24 along mating surfaces 42, 146. During the joining process, electrical cord 78 is positioned between finger 144 on upper housing section 24 and fingers 48a, 48b on lower housing section 22 so as to be confined therebetween so as to provide a strain relief for electrical cord 78, as best seen in FIG. 2.

According to one aspect of the present invention, a surface element 150 is provided to set upon the upper surface of the salt in brine tank 12. In this respect, surface element 150 is configured to have a lower surface 152 having sufficient surface area and texture so as not to slide off the upper surface of the salt within brine tank 12. In addition, surface element 150 is dimensioned to have a predetermined weight sufficient to overcome the biasing force of biasing element 112. Further in this respect, surface element 150 is dimensioned to have a density greater than water so that it will not float, and will maintain positional stability on the surface of the salt within brine tank 12 irrespective of the level or movement of water "W" within brine tank 12. In the embodiment shown, surface element 150 is generally comprised of a flat metal plate 154 having planar upper and lower surfaces with an eyelet 156 formed upon the upper surface. Plate 154 and eyelet 156 are preferably encased in a coating 158 of corrosion-resistent, non-toxic material, which in the embodiment shown, is vinyl.

A flexible connecting element 160 of predetermined length connects surface element 150 to actuator 100. In the embodiment shown, connecting element 160 is generally comprised of a cord, but may be a chain, wire or the like. Connecting element 160 is smaller in diameter than aperture 36. Connecting element 160 is secured to actuator 100 through hole 106 formed in the free end thereof, and is secured to surface element 150 by means of eyelet 156 on the upper surface thereof.

Referring now to FIG. 6, an alternate embodiment of the present invention is shown for use on brine tank 12 having a lid which may be inclined, i.e. situated in non-horizontal position. In this respect, FIG. 6 illustrates a lid 16' for a brine tank (not shown) having a surface 172 which is generally inclined. To accommodate such a lid, lower housing section 22 could be modified from that shown in FIGS. 1-5, to include a cylindrical hub 174 on the upper surface of housing section 22, which hub 174 includes a threaded opening 176 therethrough. An elongated tubular sleeve 180 having a threaded end 182 is dimensioned to be matingly received within opening 176, as shown in FIG. 6. Sleeve 180 includes an inner cylindrical bore 184 dimensioned to receive the portion of shaft 102 which extends from housing 20. In this respect, sleeve 180 has a length such that shaft 102 remains within bore 184 of sleeve 180 irrespective of the position of actuator 100 along axis "A". Cylindrical bore 184 communicates with an outward flaring, funnel-shaped aperture 186 formed at the free end of sleeve 180. Aperture 186 is smoothly flared outward toward the free end of sleeve 180 to act as a bearing surface for connecting element 160. Specifically, the curved surface of aperture 186 translates movement of connecting element 160 (which is caused by movement of surface element 150 in the brine tank) into movement of actuator 100 along axis "A". In this respect, sleeve 180 permits use of monitoring device 10 in situations where axis "A" is not vertically aligned, as will be more fully understood from the following discussion of the operation of monitoring device 10.

Referring now to the operation of salt level monitoring device 10, according to the present invention, monitoring device 10 is adapted to monitor the level of salt in brine tank 12 and to provide an indication when the level thereof has reached a predetermined minimum or "low level", at which time additional salt should be added to brine tank 12. In other words, monitoring device 10 would provide an indication that a predetermined amount of level of salt remained in brine tank 12, the remaining salt being sufficient to allow continued operation of an associated water treatment system for a limited period of time. According to the present invention, the "low level" position for a particular brine tank 12 would be established and set by the owner or operator of monitoring device 10 as hereinafter described.

In the embodiment shown, housing 20 is adapted to be mounted to the upper surface of a generally planar lid, such as lid 16 of brine tank 12 as shown in the drawings, and to be secured thereto by conventional fasteners extending through apertures 46 in tabs 44 on lower housing section 22. With housing 20 mounted to lid 16, shaft portion 102 of actuator 100 would extend through an aperture (not shown) in lid 16 and the free end of shaft portion 102 would extend into inner chamber 14 of brine tank 12 when lid 16 is mounted thereto. The "low level" position in brine tank 12 is established by the length of flexible connecting element 160 and the relative spacing between housing 20 and surface element 150. In this respect, the length of flexible connecting element 160 is set such that a predetermined distance "H" exists when surface element 150 is hanging freely within brine tank 12.

With the length of connecting element 150 set, block salt "SB" or particulate salt "SP" may be placed within brine tank 12. Surface element 150 is then placed to rest upon the upper surface of the salt within brine tank 12 and lid 16 is placed thereon. If the upper surface of the salt within brine tank 12 is above the predetermined "low level", i.e. is greater than distance "H", connecting element 160 is slack and the total weight of surface element 150 is supported by the salt, as illustrated in FIG. 4. In this condition, biasing element 112 biases actuator 100 towards a first position, shown in FIGS. 2 and 4, wherein conductive element 110 engages spaced-apart stationary contacts 84, 86, thus creating a first electrical condition. In this first electrical condition, conductive element 110 effectively creates a "short circuit" and prevents current from flowing to indicator lamp 76. In other words, an electrical circuit path is created through stationary contacts 84, 86, and conductive element 110, thereby bypassing indicator lamp 76.

As the salt within brine tank 12 is utilized to create brine solutions for use in the treatment system, the upper surface of the salt will vertically recede. As indicated above, surface element 150 is adapted to remain upon the upper surface of the salt within brine tank 12 as such salt recedes. Eventually the level of salt will recede to a point where the weight of the surface element 150 will exert a force on connecting element 160 which in turn exerts a downward force on actuator 100. Because the weight of the surface element 150 is greater than the biasing force of biasing element 112, actuator 100 will eventually be drawn downward along axis "A" and conductive element 110 will move away from its first position to a second position where it is no longer engaged with spaced-apart stationary contacts 84, 86, as illustrated in FIG. 5. In this second position, a second electrical condition is created whereby current flows through circuit paths 72, 74 to indicator lamp 76 thereby illuminating same and indicating that the salt within brine tank 12 has reached the preset "low level" and that more salt should be added to brine tank 12. Adding salt to brine tank 12 is easily accomplished by merely removing lid 16, withdrawing surface means 150 by pulling it out of the tank with connecting element 160, and then adding additional salt to brine tank 12. Surface means 150 is then set back into tank 12 upon the upper surface of the salt and lid 16 is replaced with the housing 20 still attached.

The present invention thus provides a simple, yet functional level sensor and indicator 10 which is operable with a solid or particulate material in a tank. Importantly, surface element 150 which rests upon the top surface of the salt is generally unaffected by changes in the level of water within brine tank 12. Moreover, the operative switch components, i.e. circuit 62 and conductive element 110, are disposed outside of brine tank 12 and are therefore not exposed to the corrosive brine solution therein. Still further, baffle 120 prevents exposure of circuit 62 and conductive element 110 to moisture which may collect on shaft portion 102 of actuator 100.

Modifications and alterations to device 10 as heretofore described will occur to others upon a reading and understanding of the present specification. For example, while the embodiment shown includes an L.E.D. as indicator 76, an audible device, such as bell, buzzer, beeper or the like could be provided to indicate when the second electric condition (indicating a low salt level) exists. Moreover, indicator 76 could be remote from housing 20 in a location within a house where it would be more noticeable to the user. Further, while device 10 has been shown with a transformer and an electrical cord 76 for connection to a conventional electrical outlet, a battery pack (not shown) could be provided within housing 20 or external thereto to provide the electrical power for circuit 62. Still further, while surface element 150 has been shown as a flat metal plate, it will be appreciated that other non-planar shapes and non-solid shapes may be utilized without deviating from the present invention. For example, a screen or wire mesh formed of a material having a density greater than water and weight grater than the biasing force of biasing element 112 could be provided to rest upon the surface of the salt in brine tank 12. More specifically, a screen or mesh shaped to have an outer profile confirming to and slightly smaller than the cross-section of chamber 14 of brine tank 12 would engage and rest upon the upper surface of the salt even if it is disposed to one side of brine tank 12 and the openings in the screen or mesh would allow water to flow therethrough without affecting the position of the surface element on the salt. It is intended that any and all such modifications and alterations be included insofar as they come within the scope of the invention as claimed or the equivalents thereof.

Thus, having described the invention, the following is claimed:

1. A device for monitoring the level of salt in a brine tank comprising:
    a housing,
    a first circuit within said housing connectable to an electric power source, a second circuit within said housing connectable to said electric power source
    indicator means connectable to said first and second circuits for indicating the existence of a first electrical state and a second electrical state, respectively,
    actuator means including a conductive element, said actuator having a first position wherein said conductive element conductively engages said first circuit and said indicator means indicates said first electrical state, and a second position wherein said conductive element is spaced from said first circuit and activates said second circuit so that said indicator means indicates said second electrical state,
    biasing means of a predetermined force of biasing said actuator means toward said first position,
    surface means for resting on the upper surface of said material in said tank, said surface means having a weight greater than said predetermined force of said biasing means, a density greater than water, and being movable in said brine tank as the height of salt therein varies, and
    means for connecting said surface means to said actuator means, wherein the weight of said surface means causes said actuator means to move to said second position when said surface means descends a predetermined distance.

2. A device as defined in claim 1 wherein said indicator means is an L.E.D. projecting through an opening in said housing.

3. A device as defined in claim 1 wherein said actuator means includes a shaft and said conductive element mounted to said shaft, said conductive element being movable along a predetermined axis to said first and said second positions.

4. A device as defined in claim 1 wherein said biasing means is a helical spring.

5. A device as defined in claim 1 wherein said surface means is generally comprised of a metal plate encased in a non-corrosive material and has a generally flat bottom surface, and an eyelet on said upper surface.

6. A device as defined in claim 1 wherein said connecting means is a flexible cord.

7. A device as defined in claim 1 wherein a portion of said actuator means is external to said housing, said portion being connected to said means for connecting.

8. A device as defined in claim 1 further including a transformer and an electrical cord connectable to a conventional electrical outlet as said electric power source.

9. A device as defined in claim 1 wherein said actuator means is movable in a linear direction along a predetermined axis.

10. A device for monitoring the level of solid material in a tank comprising:
a housing,
a circuit within said housing,
actuator means within said housing including a conductive element, said conductive element being movable along a predetermined axis between a first position where it conductively engages said circuit thereby creating a first electrical state and a second position where it does not conductively engage said circuit thereby creating a second electrical state,
a baffle within said housing, said baffle creating a sealed chamber with said conductive element contained therein, and
surface means for resting on the upper surface of said material in said tank said surface means being movable in said tank as the level of solid material therein varies, and
means for connecting said surface means to said actuator means wherein the weight of said surface means causes said conductive element to move along said predetermined axis when said surface means descends beyond a predetermined distance.

11. A device as defined in claim 10 further comprising an indicator which is connectable to said circuit to indicate the existence of said first and said second electrical conditions.

12. A device as defined in claim 11 wherein said indicator is an L.E.D. projecting through an opening in said housing.

13. A device as defined in claim 10 wherein said actuator means includes an elongated shaft to which said conductive element is connected.

14. A device as defined in claim 10 including a biasing means of predetermined force for biasing said conductive element towards said first position.

15. A device as defined in claim 14 wherein said biasing means is a helical spring.

16. A device as defined in claim 10 wherein said housing includes an opening dimensioned to receive said means for connecting, wherein said means for connecting has a diameter and said opening has a diameter slightly larger than said diameter of said means for connecting said opening being defined by an outward flaring smoothly contoured funnel-shaped surface, said funnel-shaped surface being a guide surface for said means for connecting to translate movement thereof into axial movement of said actuator.

17. A device as defined in claim 10 further comprising a tubular sleeve attachable to said housing, said sleeve including an outward flaring smoothly contoured funnel-shaped surface, said funnel-shaped surface being a guide surface for said means for connecting to translate movement thereof into axial movement of said actuator.

18. A device for monitoring the level of solid material in a container comprising:
a housing,
a circuit within said housing, said circuit having a first and a second electrical state,
actuator means having a first position wherein said circuit is in said first electrical state and a second position wherein said circuit is in said second electrical state, said actuator means movable in a linear direction along a predetermined axis and said actuator means having a portion external to said housing,
a baffle within said housing, said baffle creating a sealed chamber with said conductive element contained therein.
surface means for resting on the upper surface of said material in said tank, said surface means being movable in said container as the height of solid material therein varies, and
means for connecting said surface means to said portion of said actuator means external to said housing, wherein the weight of said surface means causes said actuator means to move to said second position when said surface means descends a predetermined distance.

19. A device as defined in claim 18 having an extension means connected to said housing, said extension means surrounding said portion of said actuator external to said housing.

* * * * *